3,219,677
MERCURY ACETYLIDE DIESTERS
John H. Wotiz, Huntington, W. Va., assignor to Diamond Alkali Company, Cleveland, Ohio, a corporation of Delaware
No Drawing. Filed Mar. 29, 1963, Ser. No. 269,185
13 Claims. (Cl. 260—431)

This application is a continuation-in-part of application Serial No. 833,399, filed August 13, 1959, now U.S. Patent 3,087,951.

The present invention relates to novel polymeric aceylides, their production from alpha, omega diacetylenes, and applications of such materials.

The primary object of the present invention is the provision of novel polymeric mercury acetylides.

A further object of the present invention is to prepare new and useful polyacetylene derivatives.

A still further object of the present invention is to provide novel inorganic-organic monomers and polymers.

These and other objects and advantages of the invention will more fully appear from the following description thereof.

The present invention comprises compounds obtained by reacting an alpha-omega diyne with a suorce of mercury, e.g., a mercury-containing compound. The compounds of this invention have the structure (I)   $H-\left[C\equiv C-(R^1)_n-C\equiv C-Hg-\right]_x C\equiv C-(R^2)_n-C\equiv C-H$ but during polymerization, there also may be formed cyclic polymers of the structure (II)

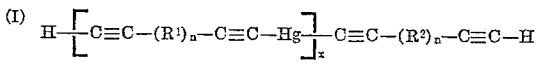

wherein $n$ is a number from 1 to 100, inclusive; $x$ and $y$ are numbers from 1 to 100, inclusive; $R^1$, $R^2$, and $R^3$ are the same or different divalent radicals selected from the group consisting of alkylene, e.g., radicals having the structure —$C_mH_{2m}$— (and corresponding branched chain radicals, wherein $m$ is a number from 1 to 50; arylene, e.g.,

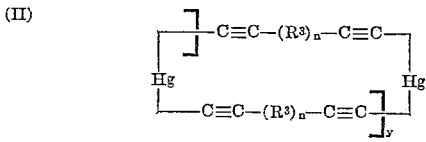

as well as corresponding ortho and meta radicals, oxygen, sulfur, mercury, boron, boron-containing radicals such as

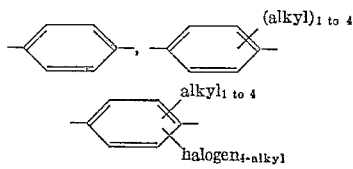

heterocyclic radicals such as

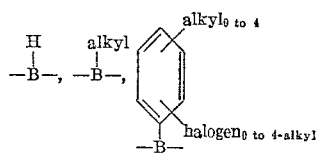

aryl substituted alkylene radicals, e.g.,

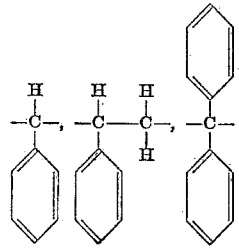

substituted alkylene radicals, e.g.,

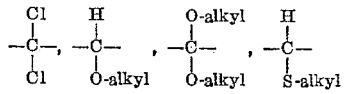

tin, silicon,

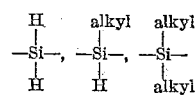

—O—$M^5$—O—, wherein $M^5$ is selected from the group consisting of calcium, barium, zinc, tin, lead,

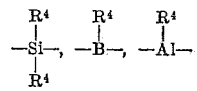

$R^4$ being selected from the group consisting of hydrogen, lower alkyl, i.e., up to about 10 carbon atoms, or aryl radicals, e.g., phenyl or naphthyl, and radicals of the foregoing types which are terminated at each end by the radical

Somewhat more specific and illustrative novel compounds of this invention are mercury derivatives of alpha, omega polyacetylenic hydrocarbons represented by the structure (III)

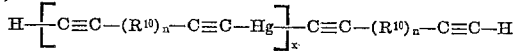

wherein $x$ and $n$ are numbers from 1 to 100, inclusive, e.g., 1 to 10; $R^{10}$ is a divalent hydrocarbon radical, e.g., alkylene, such as methylene, ethylene, propylene, isopropylene, butylene and other branched chain alkylene radicals; an arylene radical such as phenylene or naphthylene radicals; an alkarylene radical such as tolylene or xylylene radicals; or an aralkylene radical such as benzylene or phenethylene radicals.

Other specific and illustrative compounds of this invention are the linear mercury polyacetylenic diesters preared by reacting an ester-group containing diyne and a mercury compound represented by the structure

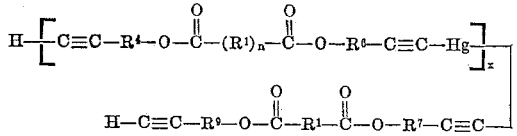

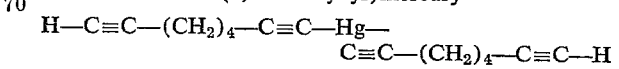

wherein $n$ is a number from 0 to 100, inclusive; $R^4$, $R^6$, $R^7$ and $R^9$ are alkylene radicals such as methylene, ethylene, butylene, propylene, or the like, and $R^1$ is as previously defined.

Illustrative of specific compounds embodying the invention (wherein $x=1$ to 100) are the following:

bis(1,7-octadiynyl)mercury

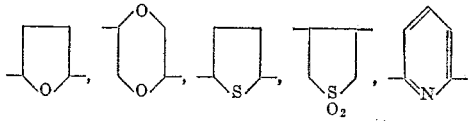

poly(1,7-octadiynyl mercury)
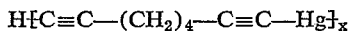
poly(1,8-nonadiynyl)mercury
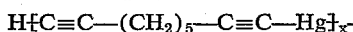
bis(1,8-nonadiynyl)mercury
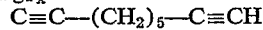
bis(2-propynyl)malonate, Hg derivative
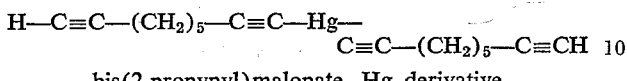
1,1-mercuribis-(4,9-dioxa-1,11-dodecadiyne-5,8-dione
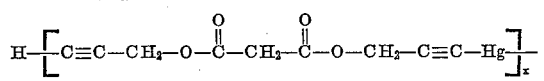
copolymer of bis(2-propynyl)terephthalate and Hg
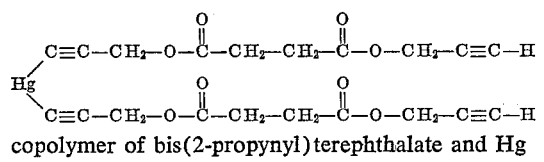
copolymer of bis(2-propynyl)tetrachloroterephthalate and Hg
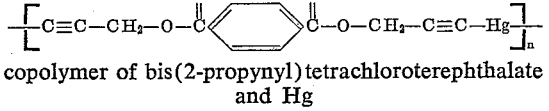
Linear polymeric mercury derivative of 4-pentynyl succinate
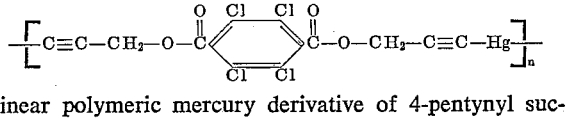
Linear polymeric mercury derivative of 4-pentynyl tetrachloro-terephthalate
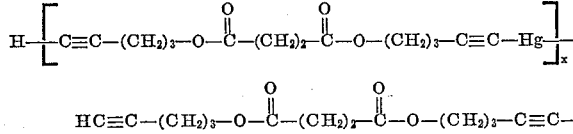
bis-(1,7,13,19-eicosatetraynyl)mercury
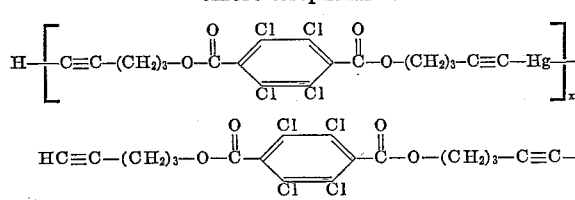
bis-(1,7,13-tetradecatriynyl)mercury HC≡C—(CH₂)₄—C≡C—(CH₂)₄—
C≡C—Hg—C≡C—(CH₂)₄—C≡C—(CH₂)₄—C≡CH poly[1,7,13-tetradecatriynyl mercury (II)]
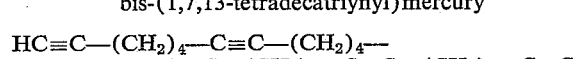
poly[dipropargyl succinate mercury (II)]
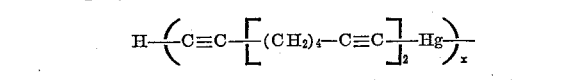
poly[dipropargyl maleate mercury (II)]
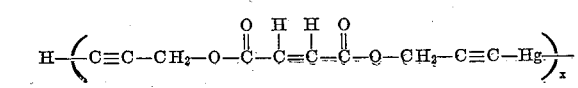

bis(1,7,12-tetradecatriynyl)mercury (II)
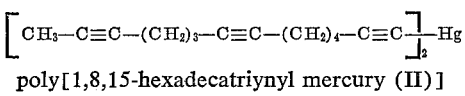
poly[1,8,15-hexadecatriynyl mercury (II)]
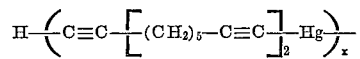
bis[1-chloro-5,11-dodecadiynyl]mercury (II)
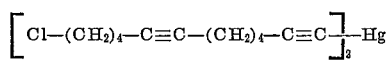
bis(methyl-1,7,13,19-heneicosatetrayne-21-oate) mercury (II)
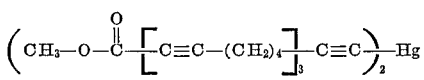
bis(6-chloro-1-hexynyl)mercury (II)
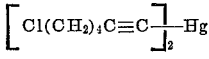
poly[bis(3-butynyl)2,3,5,6-tetrachloroterephthalate mercury (II)]
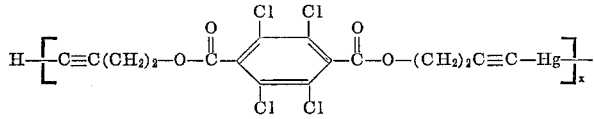

Compounds of this invention generally are characterized by low water solubility; solubility in organic solvents (depending on the degree of polymerization, size and nature of the R groups); and lack of offensive odor characteristic of relatively volatile, lower molecular weight dialkyl mercury compounds, e.g., $(C_2H_5)_2Hg$ or $(C_4H_9C≡C)_2Hg$ Compounds of this invention can be formed by chemically reacting an alpha,omega-diacetylene (diyne) of the structure

HC≡C—R¹—C≡CH wherein R¹ is as previously defined, with a mercury-containing compound which provides available mercuric cations such as an alkali metal mercuric halide, e.g., sodium, potassium, lithium, cesium or rubidium mercuric halides, potassium mercuric iodide being preferred at present, or an alkali metal mercuric cyanide, e.g., potassium mercuric cyanide.

Thus, the reaction may be illustrated as follows:

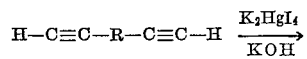
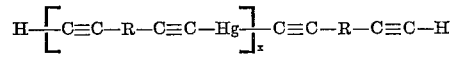

The alpha,omega diacetylenes used in the preparation of compounds of this invention can be prepared (1) by reacting disodium acetylide with an alpha,omega dihalide, e.g.,

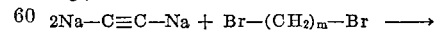
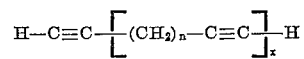

as described in U.S. Patent No. 3,052,734.

The reaction generally should be carried out at a pH greater than 7, and preferably greater than 8.5. Increasing the basicity increases the rate of reaction. The base, OH⁻, neutralizes the H⁺ produced in the

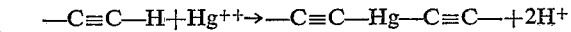

reaction. Thus, one may control the rate of reaction by pH control. This may be accomplished by a dropwise addition of dilute base to a neutral mixture of $K_2HgI_4$ and the diyne. The rate of reaction typically is followed with a pH meter. Such a controlled reaction at a pH of 8.0 to 8.5 usually leads to the formation of lower molecular weight products, e.g.,

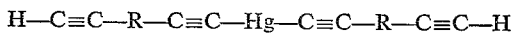

On the other hand, an excess of base leads to a rapid formation of higher molecular weight mercury acetylides. Accordingly, instead of keeping the pH constant during the reaction by a dropwise addition of base, one may use a buffered system. The reactions are conveniently carried out at room temperature. Higher temperatures, e.g., 70° C., lead to formation of discolored products, mainly due to a liberation of mercury. Elevated pressures are not required.

If desired, a suitable solvent for one or more of the reactants can be employed. Thus, the diyne can be dissolved in a lower alkanol such as methanol or ethanol. In many instances, the solvent may contain a small amount of water, e.g., 5% to 10%.

In general, the products of this invention can be recovered from water by filtration, centrifugation or the like, washed with an alcohol or water-alcohol mixture and dried.

The analysis of the reaction product, linear vs. cyclic, is on the basis of spectroscopic analysis. The presence of a terminal triple bond, —C≡C—H, is evident from the absorption bands near 3.02 and 4.7μ. These bands are naturally absent in a cyclic mercury acetylide. Preferably, the reaction of the mercury compound and the alpha,omega diacetylene is carried out in the presence of a solvent such as dioxane, tetrahydrofuran, a lower ketone such as methyl ethyl ketone, an alkanol such as ethanol, e.g., anhydrous or aqueous ethanol and, broadly, those other solvents which do not react with the alpha,omega diacetylenes defined in the structure above.

The reaction may take place at the reflux temperature of the reaction mixture, e.g., about 70° to 80° C., employing aqueous ethanol as the solvent; however, in many instances, the reaction is preferably carried out at room temperature. At times, it is desirable that the reaction be initiated at a temperature below room temperature such as about −10° C.

Generally, the above chemical reaction is carried out over a period of about ½ to 2 hours, although in certain instances, reaction times up to about 30 hours may be employed. The nature of the resultant product varies with the rate of addition and concentration of the reactants. Yields are generally better than 50%, typically better than 90%.

Purification of the resultant product is carried out by washing with water or organic solvents and drying. However, caution should be exercised in the heating of a linear mercuric polyyne of this invention in that heating may cause a change in chemical structure such as cyclization, as evidenced by infrared data. For example, the following cyclization of the corresponding linear compound may occur:

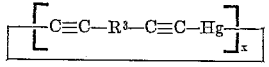

wherein R³ is as previously defined. Accordingly, purification is preferably accomplished through washing with an aqueous-organic solvent such as 50% aqueous alcohol.

The novel organic mercury compounds of this invention are useful as chemical intermediates and exhibit biological activity in addition to applications in the field of polymers. More specifically, such compounds are fungicidal as in the control of blight fungi.

The compounds of the present invention are also useful for protecting painted surfaces from attack by fungi and other organisms. While it is possible to apply the compounds of the present invention in undiluted form to the plant or other material to be protected, it is frequently desirable to apply the novel mercury compounds in admixture with either solid or liquid inert, pesticidal adjuvants. Thus, the mercury compounds can be applied to the plants for fungicidal purposes, for example, by spraying them with aqueous or organic solvent dispersions of the mercury compound. Similarly, wood surfaces can be protected by applying a protective film of the mercury compound by brushing, spraying or dipping utilizing a liquid dispersion of the material. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha, ketones such as acetone, methyl ethyl ketone and cyclohexanone, chlorinated hydrocarbons, such as carbon tetrachloride, chloroform, trichloroethylene, perchlorethylene, esters such as ethyl acetate, amyl acetate and butyl acetate, the monoalkyl ethers of ethylene glycol, e.g., the monomethyl ethers and the monoalkyl ethers of diethylene glycol, e.g., the monoethyl ether, alcohols such as ethanol, isopropanol and amyl alcohol, etc.

The mercury compounds can also be applied to plants and other materials along with inert solid fungicidal adjuvants or carriers such as talc, pyrophyllite, Attaclay, kieselguhr, chalk, diatomaceous earth, lime, calcium carbonate, bentonite, fullers' earth, cottonseed hulls, wheat flour, soybean flour, etc., pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkylphenolethylene oxides, e.g., p-isooctyl phenol condensed with 10 ethylene oxide units; and soaps, e.g., sodium stearate and sodium oleate.

The solid and liquid formulations can be prepared in any suitable method. Thus, the active ingredients, in finely divided form is a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of five to 50 percent of the total by weight. However, concentrations outside this range are operative and compositions containing from 1 to 99 percent of active ingredient by weight are contemplated, the remainder being carrier and/or any other additive or adjuvant material which may be desired. It is often advantageous to add small percentages of surface active agents, e.g., 0.5 to 1 percent of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5 to 1.0 percent of a surface active agent by weight is included in the liquid composition.

For adjuvant purposes, any desired quantity of surface active agent may be employed, such as up to 250 percent of the active ingredient by weight. If the surface active agent is used only to impart wetting qualities, for example, to the spray solution, as little as 0.05 percent, by weight, or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30 percent, by weight, of the total and may be 10 percent, or even as low as 0.01 percent.

The novel mercury compounds of the present invention can be employed in compositions containing other pesticides, more especially fungicides, insecticides and bactericides.

In order that those skilled in the art may more completely understand the present invention and the preferred methods by which the same may be carried into effect, the following specific examples may be offered.

*Example 1.—Preparation of bis(1,8-nonadiynyl)mercury*

An alkaline mercuric iodide reagent is prepared in the following manner: To a solution of 326 g. potassium iodide in 326 ml. of distilled water is added 132 g. mercuric chloride with stirring until solution is complete. The solution is filtered and 250 ml. of 10-percent aqueous sodium hydroxide solution is added. This solution contains 98 g. of mercury in 700 ml. or 0.14 g. per ml.

One-hundred ml. of the above mercuric reagent is placed in a container and neutralized with concentrated HCl. The pH is adjusted to about 8 with 5 N sodium hydroxide solution. Then and four-tenths ml. (8.4 g.) of 1,8-nonadiyne in 200 ml. of 95 percent ethanol is added dropwise alternately with the base as necessary to maintain a pH of about 8. The pH is then increased to about 10 after all the diyne is added. The resulting white precipitate is suction filtered and washed several times with 50 percent aqueous alcohol. The product is then dried over phosphorous pentoxide at 1 mm. Hg. pressure, yielding a white powder, melting point 72° to 73° C. The desired $C_{18}H_{22}Hg$ is indicated through the following elemental analytical data:

| Element | Actual percent by wt. | Calculated percent by wt. |
|---|---|---|
| C | 49.1 | 49.2 |
| H | 4.8 | 5.1 |
| Hg | 45.3 | 45.7 |

The infrared spectrum indicates the presence of a terminal triple bond and acidic hydrogen at 3.1 microns. This product has a calculated molecular weight of 439 and an observed molecular weight of 425 and is partially soluble in benzene.

*Example 2.—Preparation of poly(1,8-nonadiynyl) mercury*

Fifty ml. (0.035 mole) of the mercury reagent described in Example 1 is placed in a container and the solution is neutralized with concentrated HCl. To the neutralized solution is added 15 ml. (0.1 mole) of 1,8-nonadiyne in 100 ml. of 95% ethanol. A 5 N aqueous NaOH solution is added, dropwise, to maintain a pH of about 8 to 9. The pH is then increased to about 10 after all of the diyne is reacted. The polymer forms as a white precipitate and is separated by filtration. This polymer is insoluble in water and decomposes at a temperature of about 190° to 200° C. The assigned structure

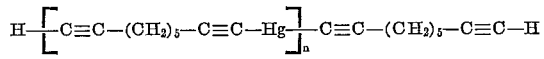

wherein $n$ is between 1 and 2, is confirmed by the analytical data

| Element | Actual percent by wt. | Calculated for bis compound percent by wt. |
|---|---|---|
| C | 44.7 | 49.2 |
| H | 4.5 | 5.1 |
| Hg | 47.8 | 45.7 |

*Example 3.—Preparation of 1,1'-mercury-bis(4,9-dioxa-1,11-dodecadiyne-5,8-dione)*

Fifty ml. (0.035 mole) of the mercuric iode reagent described in Example 1 is placed in a container and neutralized with concentrated HCl. To this mixture is added a solution of 19.4 g. (0.1 mole) of dipropargyl succinate in 200 ml. of 95% ethanol. A 5 N NaOH solution is added, dropwise, to maintain a pH of 8 to 9. The final pH of the reaction mixture is about 10. The white precipitate which forms is filtered and washed with 50% aqueous alcohol and is then air dried. The desired $C_{20}H_{18}O_8Hg$ as indicated by infrared data decomposes at a temperature of 195° to 200° C.

*Example 4.—Preparation of copolymer of mercury and dipropargyl terephthalate*

Forty-seven ml. (0.033 mole) of $K_2HgI_4$ is neutralized with concentrated HCl. Dipropargyl terephthalate (24 g., 0.1 mole) in 300 ml. of warm methanol is added. Aqueous 5 N NaOH is added, dropwise, to the stirred mixture to maintain a pH of about 8 to 9. The reaction temperaure is maintained at about 50° to 60° C. The resluting mixture is poured into a liter of cold water and filtered with suction. Water washing, drying at 50° C./1 mm. mercury gives 25 g. of white product which decomposes at a temperature of 150° to 160° C. Elemental analysis indicates that the polymer contains 40.8%, by weight, carbon, 3.2% by weight hydrogen and 23.4% by weight mercury.

*Example 5.—Preparation of the copolymer of mercury and dipropargyl tetrachloroterephthalate*

Forty-seven ml. (0.033 mole) of $K_2HgI_4$ reagent is neutralized with HCl and 38 g. (0.1 mole) of dipropargyl tetrachloroterephthalate in 600 ml. of 95% ethanol is added at a temperature of about 55° to 60° C. Five N NaOH is added, dropwise, to maintain a pH of about 8 to 9. This basic mixture is poured into a liter of cold water to precipitate the product which upon being filtered and dried weights 43 g. The white product has a melting point greater than 200° C. Elemental analysis indicates that the polymer contains 36.4% carbon, 0.9% hydrogen and 13.0% mercury. Infrared spectrum indicates the presence of terminal triple bonds and C=O groups.

*Example 6.—Preparation of bis(1,7-octadiynyl)mercury*

One hundred forty-seven ml. (0.1 mole) of $K_2HgI_4$ reagent is neutralized with concentrated HCl and 31.8 g. (0.3 mole) of 1,7-octadiyne in 200 ml. of 95% ethanol is added at room temperature. Five N NaOH is added, dropwise, to maintain a pH of 8 to 9. At the end of the reaction the pH is increased to 10 and the product is filtered, washed twice with 50-percent ethanol and vacuum dried. Precipitation from acetone with water gives 35 g.

of product having a melting point of 63° to 64° C. The structure

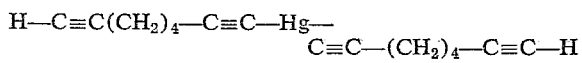

H—C≡C(CH₂)₄—C≡C—Hg—
                    C≡C—(CH₂)₄—C≡C—H is confirmed by infrared spectrum and the following elemental analysis:

| Element | Calculated percent by wt. | Actual percent by wt. |
| --- | --- | --- |
| C | 46.75 | 46.3 |
| H | 4.4 | 4.0 |
| Hg | 48.8 | 45.1 |

*Example 7.—Preparation of poly(1,7-octadiynyl mercury II)*

To 200 ml. (0.15 mole) of basic K₂HgI₄ reagent pH=12) is added 15.9 g. (0.15 mole) of 1,7-octadiyne in 100 ml. of 95% ethanol. The alcoholic diyne is added rapidly to the mercuric reagent and the pH of the reaction mixture is greater than 10. The white product which precipitates is filtered, washed with 50% aqueous alcohol and vacuum dried to give 25 g. of material which decomposes at a temperature of about 230° C. Elemental analysis shows that the polymer contains 41.4% carbon, 3.4% hydrogen and 49.2% mercury. Infrared spectrum indicates the presence of internal and terminal triple bonds.

*Example 8.—Preparation of mercury (II) derivative of dipropargyl malonate*

Fifty ml. (0.035 mole) of K₂HgI₄ reagent is neutralized with concentrated HCl and 18 g. (0.1 mole) of dipropargyl malonate in 250 ml. of 95% ethanol is added. Five N NaOH is added, dropwise, to maintain a pH of 8 to 9. The product is filtered and washed yielding 12 g. of grey powder which decomposes at a temperature of 150° to 160° C. Elemental analysis indicates that the polymer contains 23.0% carbon, 1.9% hydrogen and 53.3% mercury.

*Example 9.—Polymeric mercury derivative of bis(4-pentynyl) succinate*

Five and eight-tenths g. (0.023 mole) of bis(4-pentynyl) succinate is dissolved in 100 ml. of 95% ethanol. To this solution, at room temperature, is added 0.0084 mole of K₂HgI₄ solution which has a pH of 10. A milky suspension forms and is quenched in 500 ml. of water. A white, taffy-like polymer results (5.1 g., M.P. 46° to 50° C.) which on standing crystallizes to a product melting at 64° to 66° C. Elemental analysis indicates that the polymer contains 42.3% carbon, 4.1% hydrogen and 31.0% mercury. Infrared spectrum indicates the presence of terminal triple bonds and C=O groups.

*Example 10.—Preparation of mercury (II) derivative of bis(4-pentynyl) tetrachloroterephthalate*

Twenty-three of five-tenths ml. (0.016 mole) of K₂HgI₄ reagent is neutralized with concentrated HCl. Twenty-one and eight-tenths g. (0.05 mole) of bis(4-pentynyl)tetrachloroterephthalate is dissolved in 600 ml. of 95% ethanol (heated to 50° to 60° C. to effect solution) and added to the mercury reagent. Five N NaOH is added to the reaction mixture to maintain a pH of 8. The polymer is extracted with hot benzene and the assigned structure $C_{36}H_{25}O_8Cl_8Hg$ is confirmed by the elemental analysis.

| Element | Calculated percent by wt. | Actual percent by Wt. |
| --- | --- | --- |
| C | 40.4 | 40.5 |
| H | 2.4 | 2.6 |
| Hg | 18.7 | 17.6 |
| Cl | 26.5 | 25.0 |

Infrared spectrum indicates the presence of internal and terminal triple bonds and C=O groups.

*Example 11.—Preparation of bis(1,7,13,19-eicosatetraynyl) mercury (II)*

Twenty-six and six-tenths g. (0.1 mole) of 1,7,13,19-eicosatetrayne is dissolved in 200 ml. of 95% ehtanol. To this solution is added 60 ml. (0.05 mole) of basic K₂HgI₄ reagent. The reaction mixture has a pH of about 8 to 9. The product is filtered from the reaction mixture and recrystallized from acetone to give 78% yield of fine white powder, having a melting point of 70° to 71° C. The assigned structure for $C_{40}H_{50}Hg$

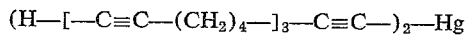

(H—[—C≡C—(CH₂)₄—]₃—C≡C—)₂—Hg is confirmed by the following elemental analysis:

| Element | Calculated percent by wt. | Actual percent by Wt. |
| --- | --- | --- |
| C | 65.7 | 65.3 |
| H | 6.9 | 6.7 |
| Hg | 27.5 | 27.2 |

Infrared spectrum indicates terminal and internal triple bonds.

*Example 12.—Preparation of bis(1,7,13-tetradecatriynyl) mercury (II) and poly[1,7,13-tetradecatriynyl mercury (II)]*

K₂HgI₄ reagent (167 ml., 0.167 mole) is neutralized with dilute HCl and a solution of 65.2 g. (0.35 mole) of 1,7,13-tetradecatriyne in 100 ml. of 95% methanol is added. The mixture is stirred and 5 N NaOH solution is added, dropwise. A pH meter is used and at a pH of 10 a reaction occurs as evidenced by the formation of a white solid. Additional NaOH is added over a period of one hour until a permanent pH of 12 is reached. The reaction mixture is poured into 200 ml. of distilled water and the semi-solid material is collected on the stirring rod. This crude material is extracted with three 250-ml. portions of refluxing methanol. Cooling the extract causes the crystallization of 21 g. of fine white needles, having a melting point of 61.5° to 62.5° C. The bis compound $C_{28}H_{34}Hg$ is confirmed by the mercury content which is found to be 35.4%, by weight, as compared to the calculated value of 35.2%. The insoluble residue is 7.4 g. of a white solid having a melting point of 110° to 130° C. The analysis is indicative of a linear polymer since the mercury content is found to be 42.1%, as compared to the calculated value of mercury for the bis compound which is 35.2% and the mercury valve for a high polymer which is 52.2%.

*Example 13.—Preparation of poly[dipropargyl succinate mercury (II)]*

To 19.4 g. (0.1 mole) of dipropargyl succinate, dissolved in 100 ml. of 95% ethanol, is added 100 ml. (0.1 mole) of K₂HgI₄ reagent containing 0.2 mole of NaOH (pH=12). The final pH of the reaction mixture is between 7 and 8. The product is filtered, triturated under water and refiltered. The filtrate is qunched with water and the solids recovered to give 21.5 g. of a white product that melts with decomposition at 200° to 230° C. Elemental analysis indicates that the product contains 37.1% carbon, 2.7% hydrogen and 39.9% mercury. Infrared spectrum indicates the presence of terminal and internal triple bonds as well as —C≡C—Hg—C≡C— linkage.

*Example 14.—Preparation of poly[dipropargyl maleate mercury (II)]*

Nineteen and two-tenths g. (0.1 mole) of recrystallized dipropargyl maletate is dissolved in 100 ml. of 95% ethanol. To this solution is added 100 ml. (0.1 mole) of basic K₂HgI₄ reagent. The pH of the reaction mixture at the end of the reaction is between 7 and 8. The precipitate is filtered and treated with 50% ethanol and water to give 19.0 g. of white powder which decomposes at a temperature of 175° to 205° C. Elemental analysis shows that the product contains 40.2% mercury and infrared spectrum indicates the presence of terminal triple bonds.

*Example 15.—Preparation of bis(1,7,12-tetradecatriynyl) mercury (II)*

To 50 ml. (0.05 mole) of basic $K_2HgI_4$ reagent is added 18.6 g. (0.10 mole) of 1,7,12-tetradecatriyne. The pH of the reaction mixture at the end of the reaction is between 7 and 8. The precipitate is removed by filtration to give 20.9 g. of a white powder which melts at a temperature of 70° to 72° C. Elemental analysis shows 35.0% mercury as compared to the 35.2% theoretical. Infrared analysis is consistent with the proposed structure of the bis compound

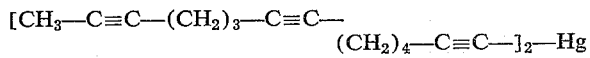

[CH$_3$—C≡C—(CH$_2$)$_3$—C≡C—(CH$_2$)$_4$—C≡C—]$_2$—Hg

*Example 16.—Preparation of poly[1,8,15-hexadecatriynyl mercury (II)]*

To 100 ml. (0.10 mole) of basic $K_2HgI_4$ reagent (pH=12) is added 21.4 g. (0.10 mole) of 1,8,15-hexadecatriyne. The pH of the reaction mixture at the end of the reaction is between 7 and 8. The precipitate is removed by filtration to give 20 g. of a linear polymer which decomposes at 105° to 110° C. Infrared spectrum indicates the presence of terminal triple bonds. Elemental analysis shows 38.4% mercury. The bis compound contains 32.0% mercury and the maximum polymer contains 48.7% mercury.

*Example 17.—Preparation of bis(1-chloro-5-11-dodecadiynyl) mercury (II)*

Nineteen and six-tenths g. (0.1 mole) of 1-chloro-5,11-dodecadiyne is dissolved in 100 ml. of 95% ethanol. To this solution is slowly added 50 ml. (0.05 mole) of basic $K_2HgI_4$ reagent (pH=12) with stirring. The reaction mixture is then poured into an equal volume of water to precipitate the product which is removed by filtration. The product is recrystallized from acetone to give 23.5 g. of product, which melts at a temperature of 49° to 50° C. The proposed structure

[Cl—(CH$_2$)$_4$—C≡C—(CH$_1$)$_4$—C≡C—]$_2$—Hg is supported by infrared analysis and the following elemental analysis:

| Element | Calculated percent by wt. | Actual percent by Wt. |
|---|---|---|
| C | 48.7 | 48.6 |
| H | 5.4 | 5.3 |
| Hg | 33.9 | 33.2 |

*Example 18.—Preparation of bis(methyl-1,7,13,19-heneicosatetrayne-21-oate) mercury (II)*

To 40 ml. (0.04 mole) of basic $K_2HgI_4$ reagent is added 27 g. (0.08 mole) of methyl-2,8,14,20-heneicosatetrayne-1-oate in 200 ml. of 95% ethanol. The pH of the reaction mixture at the end of the reaction is between 7 and 8. The product is filtered, washed with 50% ethanol and recrystallized with benzene to give 16 g. (64% yield) of purified material melting at 62° to 63° C. The proposed structure

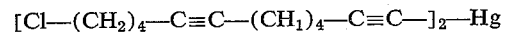

$\left(CH_3-O-\overset{O}{\underset{\|}{C}}-\left[C\equiv C-(CH_2)_4\right]_3-C\equiv C\right)_2-Hg$ is supported by infrared analysis and the following elemental analysis:

| Element | Calculated percent by wt. | Actual percent by Wt. |
|---|---|---|
| C | 62.5 | 62.8 |
| H | 6.4 | 6.5 |
| Hg | 23.7 | 23.7 |

*Example 19.—Preparation of bis(6-chloro-1-hexynyl) mercury (II)*

To 100 ml. (0.1 mole) of basic $K_2HgI_4$ reagent (pH=12) is added 23.3 g. (0.2 mole) of 1-chloro-5-hexyne in 200 ml. of methanol. The reaction mixture at the end of the reaction has a pH of between 7 and 8. The product is a waxy white material from which occluded KCl is precipitated by dissolving in ethyl ether. The product is then precipitated from the ether with ethanol as a waxy material which, on drying, gives 31.1 g. (72% yield) of product, melting at 47° to 48° C. The structure

[Cl—(CH$_2$)$_4$—C≡C—]$_2$Hg is supported by infrared analysis and the following elemental analysis:

| Element | Calculated percent by wt. | Actual percent by Wt. |
|---|---|---|
| C | 33.4 | 33.4 |
| H | 3.7 | 3.5 |
| Hg | 46.4 | 41.9 |
| Mol. wt | 431 | 422 |

*Example 20.—Preparation of bis(3-butynyl)tetrachloroterephthalate*

Into a Soxhlet thimble is placed 42.6 g. (0.125 mole) of tetrachloroterephthaloyl chloride and in the flask are placed 70 g. (1.0 mole) of 3-butynol-1, 19.7 g. (0.25 mole) of pyridine and 250 ml. of chloroform. The reaction mixture is heated to the reflux temperature of the chloroform and refluxing is continued for 9 hours. At the end of this time, the reaction mass is cooled and the excess alcohol and chloroform are stripped off to give 46.5 g. (91% yield) of crude product. The crude product is recrystallized from ether to give 45 g. (88% yield) of pure product, melting at 146° to 147° C.

*Example 21.—Preparation of poly[bis(3-butynyl)tetrachloroterephthalate mercury (II)*

To 50 ml. (0.05 mole) of basic $K_2HgI_4$ reagent (pH=12) is added 40.8 g. (0.1 mole) of bis(3-butynyl)-tetrachloroterephthalate and 200 ml. of acetone. The reaction mixture at the end of the reaction has a pH between 7 and 8. The precipitated product is removed from the reaction mass and is purified by recrystallizing from acetone and benzene to give 53.5% yield of product, which melts with decomposition at 205° to 210° C. Elemental analysis shows that the product contains the following percentages by weight: carbon—34.4%, hydrogen—2.1%, chlorine—12.2%. The infrared spectrum indicates the presence of terminal triple bonds.

*Example 22.—Tests against four species of bacteria*

Test formulations are examined for ability to inhibit the growth of four bacterial species *Erwinia amylovora* (E.a.), *Xanthomonas phaseoli* (X.p.), *Micrococcus pyrogenes* var. *aureus* (M.a.) and *Escherechia coli* (E.c.) at various concentrations. The basic test formulation contains 0.1 g. of the test chemical, 4 ml. acetone, 2 ml. stock emulsifier solution (0.5% Triton X-155 in water by volume) and 74 ml. distilled water, the concentration of toxicant in this formulation being 1250 parts per million. Lower concentrations of toxicant are obtained by diluting the basic formulation with distilled water. All of the bacterial species are cultured on nutrient agar slants except *X. phaseoli* which is grown on potato dextrose agar.

The cultures used for testing are subcultured for two sequential 24-hour periods to insure uniform test populations. Bacterial suspensions are made from the second sub-culture in the culture tube by addition of distilled water and gentle agitation, after which they are filtered through double layers of cheesecloth and adjusted to standard concentrations by turbidimetric measurment. Each of four test tubes arranged in a rack receive one ml. of the 1250 p.p.m. test formulation. After the test formulations have been measured into a test tube, 3½ ml. of distilled water and ½ ml. of bacterial suspension for each respective test organism is added to each test tube. The medication tubes are then set aside at room temperature for four hours. After this exposure period, transfers are made by means of a standard 4 mm. platinum loop to 7 ml. of sterile broth. The broth tubes are then incubated for 48 hours at 29° to 31° C., at which time bacterial growth is determined by turbidimetric measurement. A reading is recorded for each test tube after shaking. Three replicates of each organism serve as controls. Comparative growth calculations are made on the percent of the mean check reading. This value, subtracted from 100, gives percent control as compared to checks. Using this procedure, the following results are obtained:

| Compound | Concentration (p.p.m.) | Percent control | | | |
|---|---|---|---|---|---|
| | | E.a. | X.p. | M.a. | E.c. |
| 1,1'-mercuribis(4,9-dioxa-1,11-dodecadiyne-5,8-dione) | 500 | 100 | 100 | 100 | 100 |
| Poly(1,8-nonadiynyl mercury) | 250 | 100 | 100 | 56 | 14 |
| Copolymer of bis(2-propynyl) tetrachloroterephthalate and Hg | 250 | 100 | 100 | 55 | 33 |
| | 32 | 100 | 100 | 100 | 100 |
| Bis(2-propynyl)malonate, Hg derivative | 16 | 100 | 100 | 100 | 70 |
| | 8 | 100 | 100 | 100 | 75 |
| | 4 | 83 | 83 | 100 | 34 |
| | 2 | 61 | 100 | 100 | 38 |
| Polymeric Hg derivative of 4-pentynyl succinate | 64 | 100 | 100 | 100 | 100 |
| | 32 | 66 | 64 | 100 | 49 |
| | 16 | 59 | 54 | 32 | 43 |
| Poly(1,7-octadiynyl mercury) | 250 | 87 | 100 | 100 | 100 |
| | 100 | 62 | 79 | 100 | 100 |
| | 64 | 60 | 25 | 92 | 9 |
| Poly[dipropargyl maleate Hg(II)] | 250 | 100 | 100 | 100 | 92 |
| Copolymer of bis(2-propynyl) terephthalate and Hg | 250 | 100 | 100 | 100 | 100 |
| Poly[1,8,15-hexadecatriynyl Hg (II)] | 250 | 94 | 84 | 100 | 33 |
| Bis(6-chloro-1-hexynyl) Hg(II) | 250 | 57 | 11 | 100 | 53 |
| Poly[bis(3-butynyl)tetrachloroterephthalate Hg (II)] | 250 | 100 | 100 | 100 | 33 |

*Example 23.—Spore inhibition test on glass slides*

Inhibition of spore germination on glass slides by the test tube dilution method is adopted from the procedure recommended by the American Phytopathological Society's Committee on Standardization of Fungicidal Tests. In this screen, chemicals at 1000, 100, 10 and 1.0 p.p.m. are tested for ability to inhibit germination of spores from 7- to 10-day-old cultures of *Alternaria oleracea* Mil. and *Monilinia fructicola* (Wint.) honey. These concentrations refer to the actual concentrations after diluting the test preparations with spore stimulant and spore suspension. A formulation containing 0.1 g. of the test compound, 4 ml. acetone, 2 ml. stock emulsifier solution (0.5% Triton X-155 in water by volume) and 74 ml. distilled water is used for this test. The concentration of toxicant in this formulation is 1250 parts per million. The concentrations given above are diluted from this original formulation. Germination records are taken after 20 hours of incubation at 22° C. by observing several microscope fields so that at least 100 spores of each fungus have been examined at each concentration. Copper sulfate is used as a standard reference material. Test compounds are given alphabetical ratings which correspond to the concentration that inhibits germination of half the spores (ED50) in the test drops:

AAA=0.01 to 0.1 p.p.m.
AA=0.1 to 1.0 p.p.m.
A=1.0 to 10 p.p.m.
B=10 to 100 p.p.m.
C=100 to 1000 p.p.m.
D=1000 p.p.m.

Using this procedure, the following results were obtained:

| Compound tested | Rating | |
|---|---|---|
| | *A. oleracea* | *M. fructicola* |
| 1,1'-mercuribis(4,9-dioxa-1,11-dodecadiyne-5,8-dione) | A | B. |
| Poly(1,8-nonadiynyl mercury) | A | A. |
| Bis(1,7-octadiynyl)mercury | A | B. |
| Bis(2-propynyl)malonate, Hg derivative | A | A. |
| Poly(1,7-octadiynyl mercury) | A | ≧AA. |
| Poly[1,7,13-tetradecatriynyl Hg (II)] | C | A. |
| Poly[dipropargyl succinate Hg (II)] | B | ≧AA. |
| Poly[dipropargyl maleate Hg (II)] | A | ≧AA. |
| Copolymer of bis(2-propynyl) terephthalate and Hg | B | A. |
| Poly[1,8,15-hexadecatriynyl Hg (II)] | B | ≧AA. |
| Bis(1-chloro-5,11-dodecadiynyl) Hg (II) | C | B. |
| Bis(6-chloro-1-hexynyl) Hg (II) | ≧AA | ≧AA. |
| Poly[bis(3-butynyl)tetrachloroterephthalate Hg·(II)] | B | B. |

*Example 24.—Foliage protectant and eradicant tests*

The tomato foliage disease test measures the ability of the test compound to protect tomato foliage against infection by the early blight fungus *Alternaria solani* (Ell. and Mart.) Jones and Grout and the late blight fungus *Phytophthora infestans* (Mont.) De Bary. The method used is a modification of that described by McCallan and Wellman and employe tomato plants (var. Bonny Best) 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing 0.4 g. of test compound, 8 ml. acetone, 4 ml. stock emulsifier solution (0.5% Triton X-155 in water by volume) and 187.6 ml. distilled water is applied at dosages equivalent to 2000 and 400 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation without toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse.

After two days from the start of the test for early blight and three days for late blight lesion counts are made on the three uppermost fully expanded leaves. The data are converted to percentage disease control based on the number of lesions obtained on the control plants. Dosages and percent disease control are given in the following table.

| Compound | Dosage (p.p.m.) | Percent disease control | |
|---|---|---|---|
| | | E. blight | L. blight |
| 1,1'-mercuribis(4,9-dioxa-1,11-dodecadiyne-5,8-dione). | 400<br>128<br>64<br>32<br>16<br>8 | 100<br>99<br>85<br>52<br>43 | 100<br>99<br>92<br>88<br>68 |
| Poly(1,8-nonadiynyl) mercury | 2,000<br>400 | 100<br>92 | 100<br>27 |
| Copolymer of bis(2-propynyl)terephthalate and Hg. | 2,000<br>512<br>256<br>128<br>64 | 99<br>99<br>94<br>77<br>67 | 98<br>93<br>92<br>79<br>23 |
| Bis(2-propynly)malonate, Hg derivative. | 2,000<br>256<br>128<br>64<br>32 | 100<br>99<br>92<br>77<br>44 | 100<br>96<br>94<br>0<br>0 |

*Example 25.—Foliage protectant and eradicant tests*

The tomato foliage disease test measures the ability of the test compound to protect tomato foliage against infection by the early blight fungus *Alternaria solani* (Ell. and Mart.) Jones and Grout and the late blight fungus *Phytophthora infestans* (Mont.) De Bary. The method used is a modification of that described by McCallan and Wellman and employs tomato plants (var. Bonny Best) 5 to 7 inches high which are 4 to 6 weeks old. Duplicate plants, one set for each test fungus, are sprayed with variout dosages of the test formulation at 40 lbs./sq. in. air pressure while being rotated on a turntable in a hood. The center of the turntable is 45 inches from the nozzle of the spray gun. The test formulation containing 0.2 g. of test compound, 8 ml. acetone, 4 ml. stock emulsifier solution (0.5% Triton X-155 in water by volume) and 187.6 ml. distilled water is applied at dosages equivalent to 1000 and 200 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation without toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse.

After two days from the start of the test for early blight and three days for late blight lesion counts are made on the three uppermost fully expanded leaves. The data are converted to percentage disease control based on the number of lesions obtained on the control plants. Dosages and percent disease control are given in the following table.

| Compound | Dosage (p.p.m.) | Percent disease control | |
|---|---|---|---|
| | | E. blight | L. blight |
| Poly(1,7-octadiynyl) mercury | 500<br>100 | 100<br>81 | 98<br>91 |
| Poly[dipropargyl succinate Hg (II)] | 500<br>100 | 99<br>75 | 73<br>69 |
| Poly[dipropargyl maleate Hg (II)] | 500<br>100 | 100<br>94 | 100<br>58 |
| Poly[1,8,15-hexadecatriynyl Hg (II)] | 500<br>100 | 0<br>0 | 81<br>75 |
| Bis(6-chloro-1-hexynyl) Hg (II) | 1,000<br>128<br>64<br>32 | 99.7<br>99<br>98<br>92 | 99.4<br>99<br>97<br>91 |

*Example 26.—Seed decay and damping-off pea test*

This test is used to determine activity against seed decay and damping-off fungi, primarily Pythium and Rhizoctonia species.

Soil known to be infested with seed decay and damping-off fungi is placed in 4" x 4" x 3" plant band boxes and treatment is accomplished by drenching the soil with 74.25 ml. of the test formulation which is equivalent to 128 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 parts per million. Lower concentrations of toxicant are obtained by diluting the formulation with distilled water. The plant band boxes have a surface area of 16 square inches and 1.16 mg. equals 1 pound per acre. One day after treatment, soil is removed from each box and thoroughly mixed in a five-pound paper bag and then replaced in the box. Three days after drenching, 25 pea seeds, var. Perfection, are planted in each box. From the time of treatment until the pea seeds begin to emerge, the boxes are held at 20° C. in a controlled temperature cabinet. Untreated checks and a standard material are included in each test in addition to a check planted in sterilized soil. After seed emergence the box is removed to the greenhouse bench and percentage stand is recorded 14 days after planting. The percentage stand is then expressed as percent control. Using this procedure, the following results are obtained.

Compound—Bis(1,7-octadiynyl) mercury:
    Concentration, lbs./acre _____ 128
    Percent control _____ 60

*Example 27.—Seed decay and damping-off pea test*

This test is used to determine activity against seed decay and damping-off fungi, primarily Pythium and Rhizoctonia species.

Soil known to be infested with seed decay and damping-off fungi is placed in plastic pots, 3¾-inches square at top, 2¹¹⁄₁₆-inches square at base, 3¼-inches high and treatment is accomplished by drenching the soil with 37.2 ml. of the test formulation, which is equivalent to 64 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 parts per million. Lower concentrations of toxicant are obtained by diluting the formulation with distilled water. These plastic pots have a surface area at the soil line of 10.9 square inches and 0.79 mg. per pot corresponds to 1 pound per acre. One day after treatment soil is removed from each pot and thoroughly mixed in a five-pound paper bag and then replaced in the plastic pot. Three days after drenching 25 pea seeds, var. Perfection, are planted in each pot. From the time of treatment until the pea seeds begin to emerge the pots are held at 20° C. in a controlled temperature cabinet. Untreated checks and a standard material are included in each est in addition to a check planted in sterilized soil. After seed emergence the pot is removed to the greenhouse bench and percentage stand is recorded 14 days after planting. The percentage stand is then expressed as percent control. Using this procedure, the following results are obtained:

Compound—Bis(6-chloro-1-hexynyl) Hg (II):
    Concentration, lbs./acre _____ 64
    Percent control _____ 64

*Example 28.—Early blight systemic test*

This test measures the systemic fungicidal action of compounds of this invention against the early blight fungus *Alternaria solani*. Tomato plants, two to three weeks old, growing in four-inch clay pots, are employed. In the test, an appropriate dosage of test formulation is applied to the soil. A dosage of 56 ml. is equivalent to a concentration of active chemical of 112 mg., or 128 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 parts per million. Lower concentrations of toxicant are obtained by employing less toxicant and more water, thereby maintaining the same concentration of acetone and emulsifier.

One week after the drench treatment, treated plants and controls (treated with formulation without toxicant) are sprayed while being rotated on a turntable with a spore suspension containing approximately 20,000 conidia of *A. solani* per ml. The atomizer used delivers 20 ml. in the 30-second exposure period. The plants are held in a saturated atmosphere for 24 hours at 70° F. to permit spore germination and infection before removal to the greenhouse. After 48 hours lesion counts are made and converted to percentage disease control based on check plants. Using this procedure, the following results are obtained:

| Compound | Dosage | Percent disease control |
|---|---|---|
| Bis(2-propynyl)malonate, Hg derivative | 128 | 76 |
| Bis(1,7,13,19-eicosatetraynyl) mercury | 64 | 90 |

*Example 29.—Bean rust systemic test*

Pinto bean plants at a growth stage when the trifoliate leaves are just beginning to emerge from the axil of the seed leaves are used as the test species. These plants are grown in 4-inch pots and thinned to three plants per pot. Usually the plants are about 10 to 14 days old from time of planting. There are, therefore, six primary seed leaves per pot for each test unit. In the test, an appropriate amount of the test formulation is drenched on each pot. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 parts per million. A dosage of 56 ml. of the test formulation is equivalent to 112 mg. of chemical or 128 pounds per acre. Lower concentrations of toxicant are obtained by diluting the formulation with distilled water. About two or three hours after treatment the plants are exposed to a spore suspension of bean rust from a culture maintained in the greenhouse. It is not necessary to apply the spores to the plants, but spores are carried by air currents from the culture to the treated plants giving heavy uniform infection on the controls at the end of the holding period. After exposure, the plants are immediately placed in a moist chamber in a saturated atmosphere at 60° F., for 24 hours after which they are removed to the greenhouse. The rust spore suspension is prepared with one part of rust spores, 16 parts of talc and 26,000 parts of water. Counts are made about 10 days after spore exposure and the mean number of rust pustules per leaf is determined. These counts are calculated against the check counts to arrive at the percentage disease control. Using this procedure, the following results are obtained:

| Compound | Dosage, lbs./acre | Percent disease control |
|---|---|---|
| Copolymer of bis(2-propynyl)terephthalate and Hg | 128 | 64 Ph 1* |
| Bis(2-propynyl)malonate, Hg derivative | 128 | 93. |
| Bis(6-chloro-1-hexynyl) Hg (II) | 64 | 99 Ph 9. |

*Ph=phytotoxicity, from 1—slight injury to 11—kill.

*Example 30.—Soil mycelial growth inhibition test*

The following test measures the ability of compounds of this invention to inhibit mycelial growth in soil. Sterilized soil is infested with *Rhizoctonia solani* (grown on a corn meal sand medium) by mixing two 250-ml. flasks of a ten-day-old culture of the organism per level flat of sterile soil. The infested soil is then placed in small Dixie cups (4 oz. squat). Treatment of the soil is accomplished by drenching the appropriate amount of a diluted formulation containing 0.4 g. of test compound, 8 ml. acetone, 4 ml. stock emulsifier solution (0.5% Triton X-155 in water by volume) and 187.6 ml distilled water on the surface of the soil in the test cup. The concentration of toxicant in this formulation is 2000 parts per million. Lower concentrations of toxicant are obtained by diluting the formulation with distilled water. Surface area of the soil in the cups is 5.73 square inches; therefore, a rate of one pound per acre requires 0.414 mg. of chemical per cup. After drenching the cups are placed in a saturated atmosphere at 70° F. for 48 hours. By this time the fungus mycelium has completely overgrown the surface of the soil in the control cups. Inhibition of mycelial growth in the treated cups is estimated on a scale from zero, complete inhibition of growth, to ten which is equivalent to controls. These grades are expressed as percent control. Using this procedure, the following results are obtained:

| Compound | Concentration, lbs./acre | Percent control |
|---|---|---|
| Poly[dipropargyl maleate Hg (II)] | 32 | 95 |
| Bis(6-chloro-1-hexynyl) Hg (II) | 64 | 40 |

*Example 31.—Cucumber anthracnose test*

This test measures the ability of the test compound to control anthracnose of cucumber incited by the fungus *Colletotrichum lagenarium*.

The method used is a modification of that described by McCallan and Wellman and employs cucumber plants, (var. National Pickling) having one fully expanded leaf. Duplicate plants are sprayed with various dosages of the test formulation at 20 lbs./sq. in. air pressure while being rotated on a turntable in a hood. The center of the turntable is 45 inches from the nozzle of the spray gun. The test formulation containing 0.2 g. of test compound, 8 ml. acetone, 4 ml. stock emulsifier solution (0.5% Triton X-155 in water by volume) and 187.6 ml. distilled water is applied at dosages equivalent to 1000 to 200 p.p.m. of the test chemical. Lower concentrations of toxicant are obtained by employing less toxicant and more water, thereby maintaining the same concentration of acetone and emulsifier.

After the spray deposit is dry treated plants and controls (sprayed with formulation without toxicant) are sprayed while being rotated on a turntable with a spore suspension containing approximately 400,000 spores per ml. of *Colletotrichum lagenarium*. The atomizer used delivers 20 ml. in the 30-second exposure period. The plants are held in a saturated atmosphere for 24 hours at 70° F. to permit spore germination and infection before removal to the greenhouse.

After four to six days from the start of the test lesion counts are made. The data are converted to percentage disease control based on th number of lesions obtained on the control plants. Dosages and percent disease control are given in the following table.

| Compound | Dosage (p.p.m.) | Percent disease control |
|---|---|---|
| 1,1'-mercuribis(4,9-dioxa-1,11-dodecadiyne-5,8-dione) | 64 | 100 |
| | 32 | 82 |

*Example 32.—See germination of broadleaf and grassy weeds*

Seeds of crabgrass and lambsquarter are exposed in Petri dishes to aqueous suspensions or solutions of the test chemicals at 1250 and 125 parts per million. This test formulation contains 0.1 g. of the test compound, 4 ml. acetone, 2 ml. stock emulsifier solution (0.5% Triton X-155 in water by volume) and 74 ml. distilled water. The concentration of toxicant in this formulation is 1250 parts per million. Lower concentrations of toxicant are obtained by diluting the formulation with distilled water. A standard scoop of each type of seed (0.24 ml.) is uniformly scattered in separate dishes containing filter paper discs moistened with 5 ml. of the test formulation at each concentration. After 10 to 14 days at 70° F. test compounds are rated on ability to inhibit germination of seed. The alphabetical ratings correspond to the concentration that inhibits germination of half of the seeds (ED50) in the Petri dish; A=1.25 to 12.5 p.p.m., B=12.5 to 125 p.p.m., C=125 to 1250 p.p.m., and D=greater than 1250. Ratings of D, C and equal to or greater than B are the possible ratings since only two concentrations are used. The A and B ratings are used primarily for the standards. Using this procedure, the following results were obtained:

| Compound tested | Rating | |
| --- | --- | --- |
|  | Broadleaf | Grassy |
| Copolymer of bis(2-propynyl)terephthalate and Hg. | B | C |
| Bis(2-propynyl)malonate, Hg derivative | C | C |

*Example 33.—Soil watering tests—tomato and bean*

To measure the growth regulating and herbicidal responses when chemicals are absorbed by roots and translocated, tomato plants, var. Bonny Best, 5 to 7 inches tall, and beans, var. Tendergreen, just as the trifoliate leaves are beginning to unfold, are treated by drenching appropriate portions of a formulation containing 0.4 g. of the test chemical, 8 ml. acetone, 4 ml. stock emulsifier solution (0.5% Triton X-155 in water) and 187.6 ml. distilled water (concentration of the test chemical=2000 p.p.m.) on soil in clay pots containing the test plants. Tomatoes (1 plant per 4-inch pot) and bean plants (4 plants per 3½-inch pot) are treated with appropriate dosages of the 2000 p.p.m. formulation. Dosages of 56 ml. of the formulation in the 4-inch pot and 42 ml. in the 3½-inch pot are equivalent to 112 mg. and 84 mg. of chemical per pot, respectively, or 128 pounds per acre. Plants are held in a greenhouse for two weeks before records are taken. Phytotoxicity is rated on the scale from 0, indicating no plant injury, to 11, plant kill. Additionally, all other responses such as stunting, formative effects, defoliant activity, growth regulant properties, chlorosis and the like are recorded. Using this procedure, the following results are obtained:

Compound—1,1' - mercuribis(4,9 - dioxa - 1,11 - dodecadiyne-5,8-dione):
    Concentration, lbs./acre _____ 128
    Phytotoxicity rating:
        Tomato _____ Ph 0
        Beans _____ Ph 11

*Example 34.—Pre-emergence tests in soil*

To evaluate the effect of compounds of this invention upon the germination and subsequent growth of seeds in soil, two mixtures of seeds are used. One contains three broadleaf species (turnip, flax and alfalfa) and the other contains three grass species (millet, ryegrass and timothy). Each mixture is planted diagonally in one-half of a 9x9x2-inch aluminum pan filled to within one-half inch of the top with composted greenhouse soil. After planting, the seed mixture is uniformly covered with about one-quarter inch soil and watered. After 24 hours, a quantity of a basic formulation containing 167 mg. of the test chemical, 20 ml. acetone, 2 drops Triton X-155, and 20 ml. of distilled water is sprayed, at 10 pounds per square inch air pressure, uniformly over the surface of the pan. A dosage of 40 ml. of the basic formulation is equivalent to 32 pounds active chemical per acre. When less concentrated dosages are desired, the basic formulation is diluted. Two weeks after treatment, estimates are made on the fresh weight of seedling stand in the treated pans as well as in an untreated control pan. The percent control obtained with the test chemical is calculated. Using this procedure, the following results are obtained:

|  | Concentration, lbs./acre | Percent control | |
| --- | --- | --- | --- |
|  |  | Broadleaf weeds | Grassy weeds |
| 1,1'-mercuribis(4,9-dioxa-1,11-dodecadiyne-5,8-dione) | 64 | 0 | 40 |
| Polymeric Hg derivative of 4-pentynyl succinate | 16 | 90 | 50 |

*Example 35.—Root-knot nematode test*

This test is an evaluation of the effectiveness of the compounds of this invention against root-knot nematodes (Meloidogyne sp.).

Composted greenhouse soil diluted by one-third with clean, washed sand is placed in ½-gallon glazed crocks and infested with 3 to 5 g. of knotted or galled tomato roots. Treatment is accomplished by mixing the test chemical intimately with the soil if a solid, or by drenching, if a liquid, paste, or of gummy consistency. The drench formulation contains 4% acetone, 0.01% Triton X-155, 0.384% test chemical in a total volume of 100 ml. of water, all of which is drenched on the test crock. Concentration of this formulation is 256 pounds per acre, based on the surface area of the ½-gallon test container. The soil surface area equals 21.7 square inches, therefore, 256 pounds per acre equals 384 mg. of chemical. Lower concentrations are prepared by employing less of the test chemical in the formulation. The mixing of the solid test chemicals is accomplished by placing the infested soil and the chemical in a 20-pound paper bag and mixing thoroughly. The soil is then replaced in the crock to which is added 100 ml. of water. In the case of the drench treatment, the chemicals are mixed after 2 or 3 days as described above via the paper bag method. After treatment, all crocks are stored at 20° C., being covered with plastic to maintain moisture.

Seven days after treatment, three seedling (var. Bonny Best) tomatoes are transplanted into each crock. After three weeks in the greenhouse, the plants are removed from the soil carefully and the roots inspected for nematode galls. A rating of infection is made from 0=no galls or complete control to 10=heavily galled roots comparable to controls. Phytotoxicity results are also reported (0=no effect to 11=plant dead). Each of the three plant root systems is rated separately and the average is multiplied by 10 and subtracted from 100 to give percent nematode control. Results of the tests are as follows:

| Compound | Concentration, lbs./acre | Percent control root-knot nematodes |
| --- | --- | --- |
| 1,1'-mercuribis(4,9-dioxa-1,11-dodecadiyne-5,8-dione) | 256 | 90 |
| Copolymer of bis(2-propynyl)terephthalate and Hg | 256 | 60 |
| Bis(1,7-octadiynyl)mercury | 256 | 70 |
| Poly(1,7-octadiynyl mercury) | 64 | 50 |
| Poly[dipropargyl succinate Hg (II)] | 64 | 90 |
| Bis(6-chloro-1-hexynyl) Hg (II) | 128 | 60 |

Example 36.—Panagrellus test

Nonplant parasitic nematodes (*Panagrellus redivivus*) are exposed to the test chemical in small watch glasses, U.S. Bureau of Plant Industry's model, 27 mm. diameter x 8 mm. deep, within a 9 cm. Petri dish. Three watch glasses are used; two of these receive appropriate dosages of a test formulation containing 0.1 g. or 0.1 ml. of the test compound, 4 ml. acetone, 2 ml. stock emulsifier solution (0.5% Triton X–155 by volume) and 74 ml. distilled water, 0.1 g. being equivalent to 1250 p.p.m. and the third receives the same dosage of distilled water. After all of the test dishes have been set up in this manner, a 0.1 ml. of Panagrellus suspension is added to each watch glass bringing the concentration down to exactly 1000 p.p.m. After these additions are made, the Petri dishes are closed. The watch glass in the center of each dish, containing only water and nematodes, detects fumigant action. The other two containing chemical and nematodes measure contact activity. The total amount of toxicant in the Petri dish is 1 mg. for fumigant action. Dilution is made of the 1250 p.p.m. formulation for lower concentrations.

The organism is grown and cooked oatmeal which is sterilized in the autoclave before being centrally inoculated from an old culture. The culture is held at 22° C. and after 10 to 14 days the surface of the oatmeal is swarming with nematodes which are visible to the eye. Such a culture is used to prepare the test suspension. The concentration of the nematodes is adjusted so that each watch glass contains 30 to 40 nematodes. At the end of 48 hours mortality counts are made from which percent kill can be determined. Using this procedure, the following results are obtained:

| Compound | Concentration, p.p.m. | Percent mortality |
|---|---|---|
| 1,1'-mercuribis(4,9-dioxa-1,11-dodecadiyne-5,8-dione) | 100 | 91 |
| Bis(1,7-octadiynyl)mercury | 100 | 95 |
| Bis(2-propynyl)malonate, Hg derivative | 100 | 96 |
| Poly(1,7-octadiynyl mercury) | 100 | 100 |
| Bis(6-chloro-1-hexynyl) Hg (II) | 100 | 100 |

Example 37

In order to test the mercury compounds of this invention for their ability to inhibit the formation of mold on exterior painted surfaces and to contribute to the general appearance of the surfaces, the compounds are incorporated into a paint formulation which is applied to test panels and exposed to the atmosphere. For purposes of comparison, a reference standard is applied to a similar test panel which is subjected to identical exposure conditions.

All of the test panels are given a primer coat of commercially available white exterior undercoater paint. The second coat which is applied to the panels is a white gloss exterior paint, having the following composition:

| Percent by weight: | Ingredient |
|---|---|
| 19.5 | Zinc oxide. |
| 4.4 | Monobasic lead sulfate. |
| 10.1 | Titanium dioxide. |
| 25.8 | Silicates. |
| 3.2 | Calcium carbonate. |
| 15.9 | Raw linseed oil. |
| 11.1 | High-polymer linseed oil. |
| 3.7 | Drier. |
| 6.3 | Mineral spirits. |

The reference standard is formulated by combining 1.5 gallons of phenyl mercury oleate with 100 gallons of the above paint. Each of the mercury compounds of this invention is combined with the above paint composition using an amount of the compound such that the mercury content of the formulated paint is equal to that of the reference standard.

After exposure to the atmosphere for a sufficient length of time, the panels are given a numerical rating from 10 to 0. A rating of 10 indicates that the painted surface is unchanged after exposure and a rating of 0 indicates a definite dinginess or loss of whiteness. One series of these test panels is exposed to the atmosphere near the Gulf Coast of Southern United States for a period of seven months. The ratings on these panels are given in Table I.

TABLE I

| Mercury compound: | Rating—mold |
|---|---|
| Standard—phenyl mercury oleate | 3 |
| Copolymer of bis(2-propylnyl)tetrachloroterephthalate and Hg | 4 |
| Bis(1,7-octadiynyl)mercury | 3 |
| Bis(1,7,13,19-eicosatetraynyl)mercury | 3 |
| Poly[dipropargyl succinate Hg (II)] | 3 |
| Poly[dipropargyl maleate Hg (II)] | 3 |
| Copolymer of bis(2-propynyl)terephthalate and Hg | 3 |
| Bis(1,7,12-tetradecatriynyl)mercury (II) | 4 |
| Poly[1,8,15-hexadecatriynyl Hg (II)] | 3 |
| Bis(1-chloro-5,11-dodecadiynyl)mercury (II) | 4 |
| Bis(methyl-1,7,13,19-heneicosatetrayne-21-oate) Hg (II) | 4 |

A second series of test panels is exposed to the atmosphere near the Great Lakes for a period of nine months. These panels are arranged on the exposure rack in such a manner that, except when blown by wind, rain on an upper panel does not drip onto the lower panel. The ratings on these panels are given in Table II.

TABLE II

| Mercury compound | Rating mold | General appearance |
|---|---|---|
| Standard—phenyl mercury oleate | 6 | 4 |
| Copolymer of bis (2-propynyl)tetrachloroterephthalate and Hg | 6 | 5 |
| Bis(1,7,13,19-eicosatetraynyl)mercury | 6 | 4 |
| Bis(1,7,13-tetradecatriynyl)mercury | 6 | 4 |
| Poly(1,8-nonadiynyl mercury) | 6 | 5 |
| Poly[dipropargyl succinate Hg (II)] | 6 | 5 |
| Poly[dipropargyl maleate Hg (II)] | 7 | 5 |
| Copolymer of bis(2-propynyl)terephthalate and Hg | 6 | 4 |
| Bis(1,7,12-tetradecatriynyl) mercury (II) | 6 | 4 |
| Bis(1-chloro-5,11-dodecadiynyl) mercury (II) | 6 | 4 |
| Bis(methyl-1,7,13,19-heneicosate-trayne-21-oate) Hg (II) | 6 | 5 |
| Bis(6-chloro-1-hexynyl) Hg (II) | 6 | 5 |
| Poly[bis (3-butynyl) tetrachloroterephthalate Hg (II)] | 6 | 5 |

Results of these tests indicate that the mercury compounds of this invention are at least equal to and frequently are better than the reference standard, both in inhibiting mold and in contributing to the general appearance of the painted surface.

It is to be understood that although the invention has been described with specific reference to particular embodiments thereof, it is not to be so limited, since changes and alterations therein may be made which are within the full intended scope of this invention as defined by the appended claims.

Results of these tests indicate that the mercury compounds of this invention are at least equal to and frequently are better than the reference standard, both in inhibiting mold and in contributing to the general appearance of the painted surface.

It is to be understood that although the invention has been described with specific reference to particular embodiments thereof, it is not to be so limited, since changes and alterations therein may be made which are within the full intended scope of this invention as defined by the appended claims.

What is claimed is:

1. A polyacetylenic diester having the structure

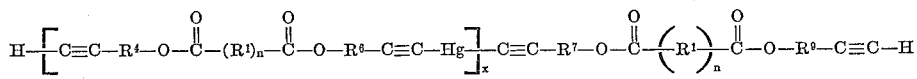

wherein $n$ is a number from 1 to 100, inclusive; $x$ is a number from 1 to 100, inclusive; $R^4$, $R^6$, $R^7$ and $R^9$ are alkylene radicals; and $R^1$ is a divalent hydrocarbon radical selected from the group consisting of alkylene, arylene, and haloarylene radicals.

2. A polyacetylenic diester having the structure

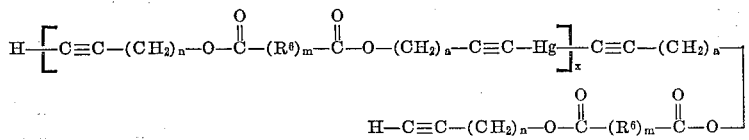

wherein $a$, $m$, $n$ and $x$ are each integers from 1 to 100, inclusive, and $R^6$ is a divalent hydrocarbon radical selected from the group consisting of alkylene, and haloarylene radicals.

3. 1,1'-mercuribis(4,9-dioxa - 1,11 - dodecadyne - 5,8-dione).

4. Poly[bis(2-propynyl)terephthalate mercury (II)] which contains approximately 41 percent by weight carbon, 3 percent by weight hydrogen, 23 percent by weight mercury and decomposes at a temperature of about 150° to 160° C.

5. Poly[bis(2-propynyl)-tetrachloroterephthalate mercury (II)] which contains approximately 36.5 percent by weight carbon, 1 percent by weight hydrogen, 13 percent by weight mercury, has terminal acetylenic bonds and has a melting point above 200° C.

6. Poly[bis(4-pentynyl)succinate mercury (II)] which contains approximately 42 percent by weight carbon, 4 percent by weight hydrogen and 31 percent by weight mercury, has terminal trip bonds and melts at a temperature of about 64° to 66° C.

7. Poly[bis(4 - pentynyl)tetrachloroterephthalate mercury (II)] having the empirical formula $C_{36}H_{25}O_8Cl_8Hg$.

8. Poly[dipropargyl succinate mercury (II)] which melts with decomposition at a temperature of about 200° to 230° C. and contains approximately 37 percent by weight carbon, 2.5 percent by weight hydrogen and 40 percent by weight mercury.

9. Poly[dipropargyl maleate mercury (II)] which decomposes at a temperature of about 175° to 205° C., contains approximately 40 percent by weight mercury and has terminal triple bonds.

10. Bis(methyl-1,7,13,19-heneicosatetrayne - 21 - oate) mercury (II).

11. Poly[bis(3 - butynyl)tetrachloroterephthalate mercury (II)] which melts with decomposition at a temperature of about 205° to 210° C., contains approximately 34.5 percent by weight carbon, 2 percent by weight hydrogen and 12 percent by weight chlorine and has termianl triple bonds.

12. The reaction product of bis(2-propynyl)-malonate and potassium mercuric iodide which decomposes at a temperature of about 150° to 160° C. and contains approximately 23 percent by weight carbon, 2 percent by weight hydrogen and 53 percent by weight mercury.

13. The method of preparing an acetylenic mercury compound of the structure

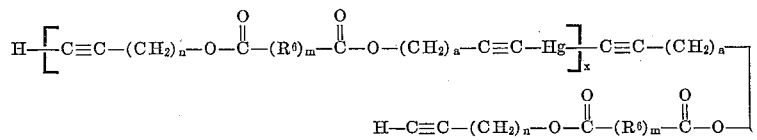

which comprises reaction a compound of the structure $$H-C\equiv C-(CH_2)_n-O-\overset{O}{\underset{\|}{C}}-(R^6)_m-\overset{O}{\underset{\|}{C}}-O-(CH_2)_a-C\equiv C-H$$

with a mercuric cationic reagent selected from the group consisting of alkali metal mercuric halides and cyanides, wherein $n$ is an integer of at least 1; $m$ is an integer of at least; 1; $a$ is an integer of at least 1; $x$ is an integer of at least 1; and $R^6$ is selected from the group consisting of alkylene, arylene, and haloarylene radicals, at a pH greater than 7 and at a temperature from about room temperature to about 70° C.

References Cited by the Examiner

UNITED STATES PATENTS

| | | | |
|---|---|---|---|
| 2,145,595 | 1/1939 | Garnitz et al. | 260—431 |
| 2,251,778 | 8/1941 | Bonrath et al. | 260—431 |
| 2,329,883 | 9/1943 | Daskais | 260—431 |
| 2,329,884 | 9/1943 | Daskais | 260—431 |
| 2,369,339 | 2/1945 | Daskais | 260—431 |
| 2,990,265 | 6/1961 | Hammet et al. | 71—2.3 |
| 3,054,668 | 9/1962 | Josephs | 71—2.7 |
| 3,087,951 | 4/1963 | Wotiz | 260—431 |

FOREIGN PATENTS

| | | |
|---|---|---|
| 484,090 | 4/1938 | Great Britain. |

OTHER REFERENCES

Coates et al., Organo-Metallic Compounds, (London), 1956, pages 49–51.

TOBIAS E. LEVOW, *Primary Examiner.*

JULIAN S. LEVITT, *Examiner.*